(12) United States Patent
Mori et al.

(10) Patent No.: US 9,817,568 B2
(45) Date of Patent: *Nov. 14, 2017

(54) SYSTEM AND METHOD FOR CONTROLLING AN ELECTRONIC DEVICE

(75) Inventors: Robert Felice Mori, Mountain View, CA (US); Philip Gabriel Yurkonis, Mountain View, CA (US); Jonathan Haking Lo, Mountain View, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 25 days.

This patent is subject to a terminal disclaimer.

(21) Appl. No.: 13/408,818

(22) Filed: Feb. 29, 2012

(65) Prior Publication Data

US 2013/0222274 A1    Aug. 29, 2013

(51) Int. Cl.
| | |
|---|---|
| *G06F 3/041* | (2006.01) |
| *G06F 3/0488* | (2013.01) |
| *B60K 37/06* | (2006.01) |
| *B60R 11/02* | (2006.01) |
| *B60K 35/00* | (2006.01) |
| *G06F 15/02* | (2006.01) |
| *G06F 3/0483* | (2013.01) |
| *B60R 11/00* | (2006.01) |

(52) U.S. Cl.
CPC .......... *G06F 3/04883* (2013.01); *B60K 35/00* (2013.01); *B60K 37/06* (2013.01); *B60R 11/0264* (2013.01); *G06F 3/0483* (2013.01); *G06F 15/0291* (2013.01); *B60K 2350/1052* (2013.01); *B60R 2011/001* (2013.01); *G06F 2203/04808* (2013.01)

(58) Field of Classification Search
None
See application file for complete search history.

(56) References Cited

U.S. PATENT DOCUMENTS 8,407,613 B2 * 3/2013 Hope ................. G06F 3/04817
715/764
2009/0143141 A1 * 6/2009 Wells ..................... G07F 17/32
463/37

(Continued)

FOREIGN PATENT DOCUMENTS

| | | | | |
|---|---|---|---|---|
| DE | WO 2010/142543 A1 * | 12/2010 | ............ | G06K 3/048 |
| EP | 2404784 | 11/2012 | | |
| WO | 2011/145248 A1 | 11/2011 | | |

OTHER PUBLICATIONS

Apple granted patent for steering-wheel controls to curb distracted driving; Online at http://www.autoblog.com/2012/05/17/apple-granted-patent-for-steering-wheel-controls-to-curb-distrac/?ncid=dynaldushpmg00000073; posted May 17, 2012; retrieved Jul. 19, 2012.

(Continued)

*Primary Examiner* — Patrick Edouard
*Assistant Examiner* — Douglas M Wilson
(74) *Attorney, Agent, or Firm* — Jeffrey N. Giunta; Fleit Gibbons Gutman Bongini & Bianco P.L.

(57) ABSTRACT

A method, computer readable storage medium, and electronic device are provided which operates on hierarchical data having a plurality of levels by detecting one of a plurality of gestures on a touch-sensitive input mechanism of the electronic device. Each of the plurality of gestures is associated with a different level in the hierarchical data.

20 Claims, 17 Drawing Sheets

(56) References Cited

U.S. PATENT DOCUMENTS

| | | | |
|---|---|---|---|
| 2010/0313125 A1* | 12/2010 | Fleizach | G06F 3/04883 715/702 |
| 2011/0010672 A1* | 1/2011 | Hope | G06F 3/04817 715/841 |
| 2011/0188197 A1 | 8/2011 | Jackson | |
| 2011/0209088 A1* | 8/2011 | Hinckley | G06F 3/0488 715/810 |
| 2011/0209099 A1 | 8/2011 | Hinckley et al. | |
| 2011/0210926 A1 | 9/2011 | Pasquero et al. | |
| 2011/0279384 A1* | 11/2011 | Miller | G06F 3/04883 345/173 |
| 2012/0084651 A1* | 4/2012 | Miller | G06F 3/04883 715/716 |
| 2012/0084725 A1* | 4/2012 | Sirpal | G06F 1/1616 715/802 |
| 2012/0098768 A1* | 4/2012 | Bendewald | B60K 35/00 345/173 |
| 2013/0074011 A1* | 3/2013 | Nakamura | G06F 1/1616 715/854 |
| 2013/0080975 A1* | 3/2013 | Geithner | G06F 3/0488 715/828 |
| 2013/0100036 A1* | 4/2013 | Papakipos | G06F 1/1643 345/173 |
| 2014/0304636 A1* | 10/2014 | Boelter | G06F 3/04883 715/771 |

OTHER PUBLICATIONS

OS X Lion: About Multi-Touch gestures; http://support.com/kb/HT4721; last modified Sep. 7, 2011; retrieved May 3, 2012.

Office Action dated May 12, 2014; in corresponding Canadian patent application No. 2,807,728.

Extended European Search dated Jul. 31, 2015, received for European Application No. 12157795.1.

Examination Report dated Jun. 22, 2017, received for European Application No. 12157795.1.

English Counterpart to Foreign Reference for WO 2011/145248A1 to Panasonic Corp., Japan, Nov. 24, 2011.

* cited by examiner

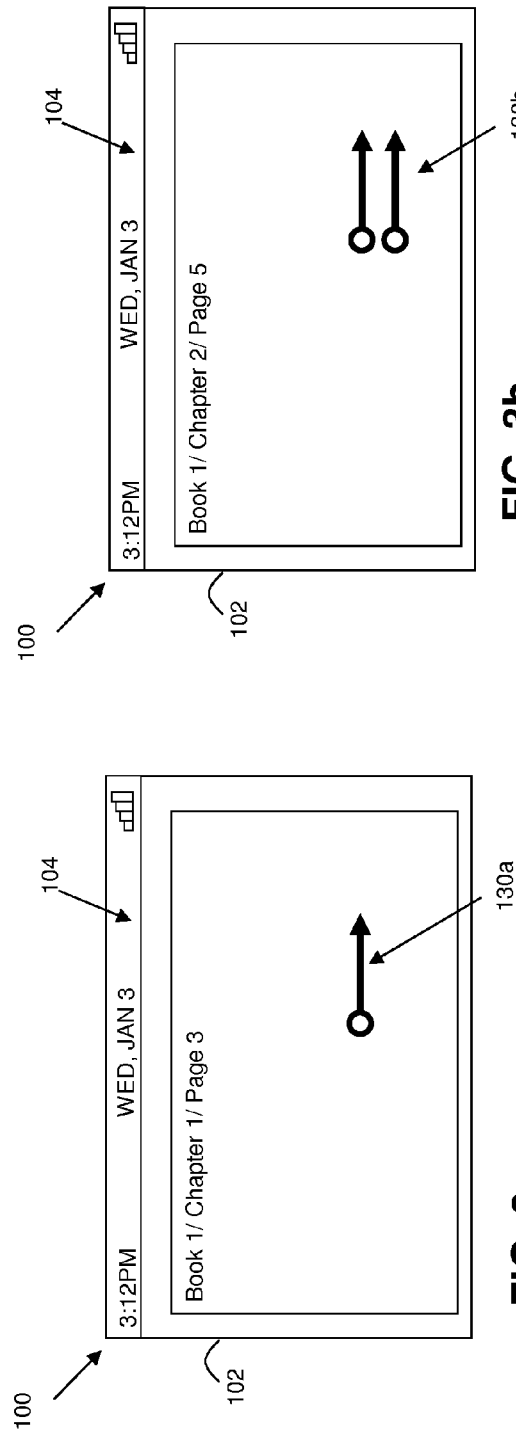
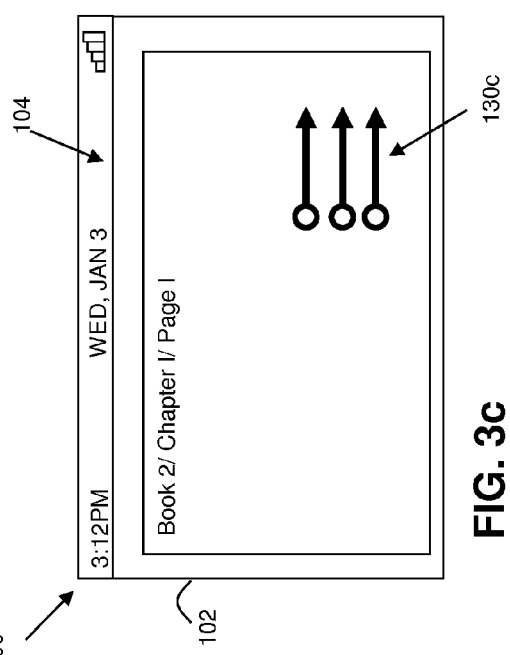
FIG. 3a
FIG. 3b
FIG. 3c

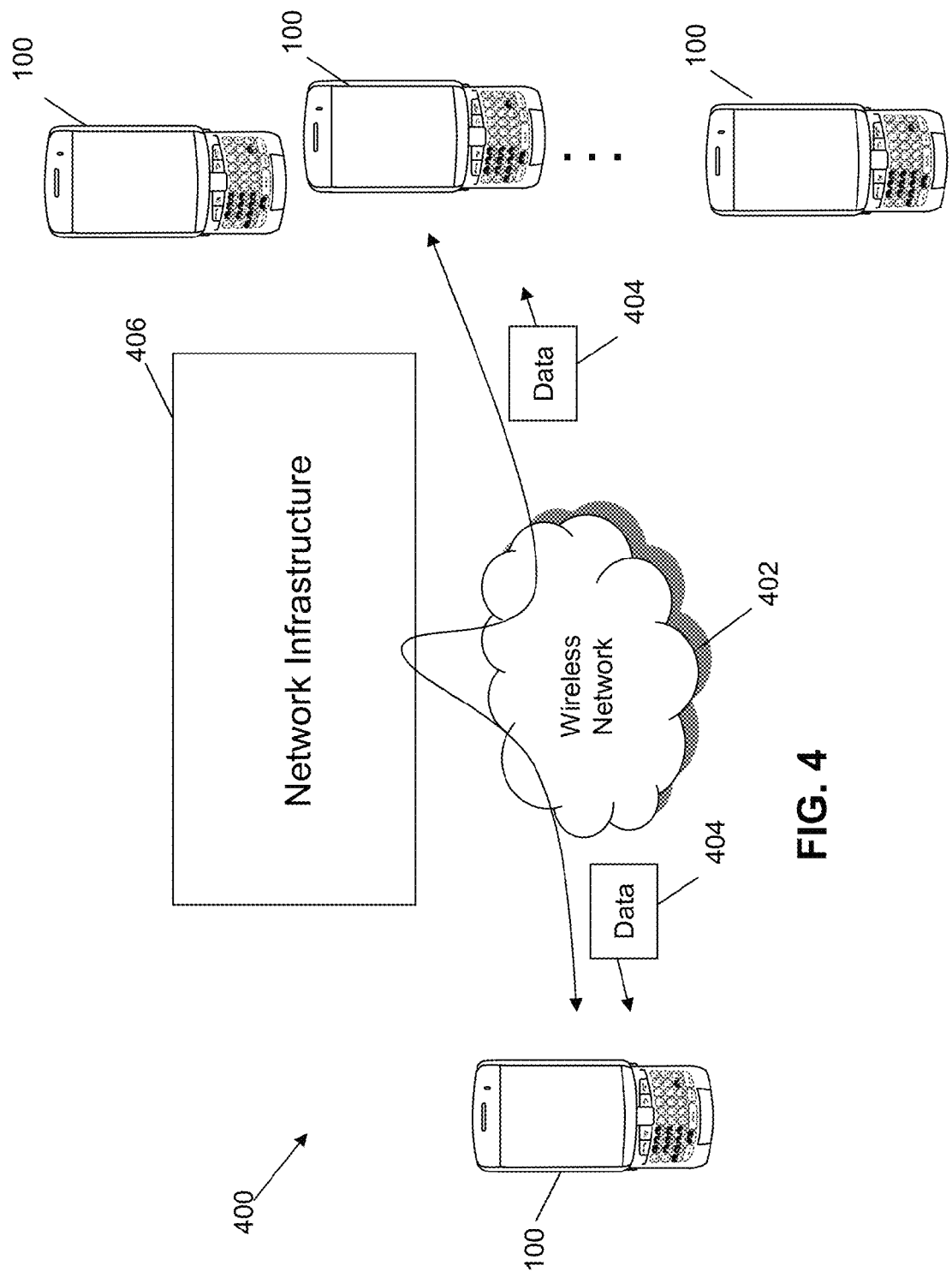

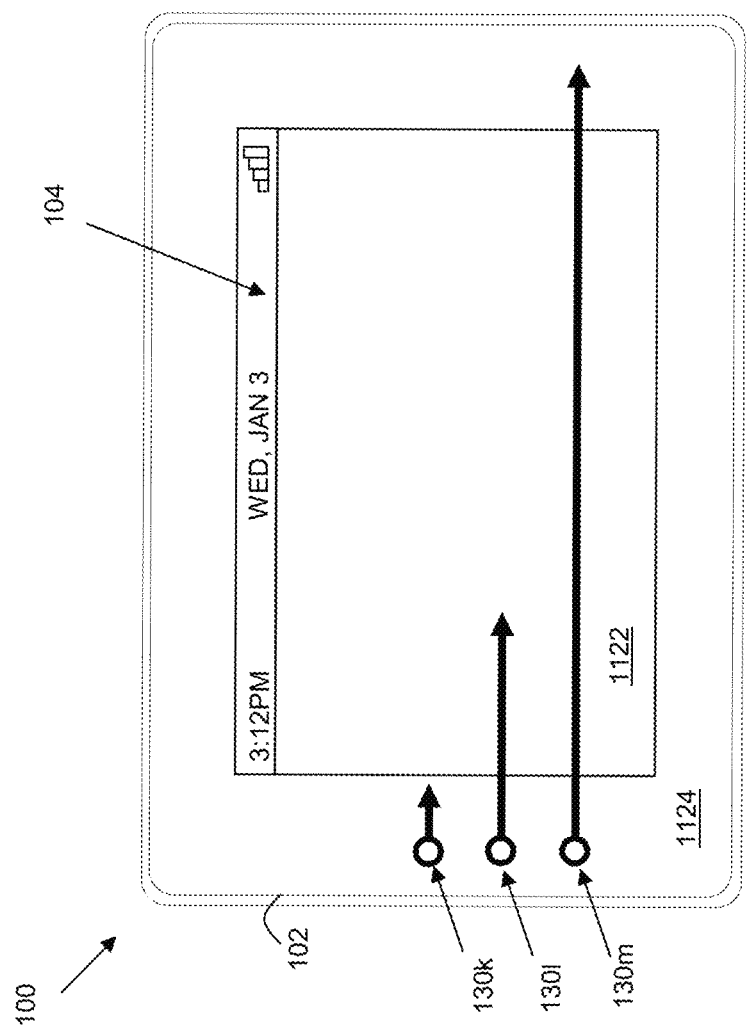

SYSTEM AND METHOD FOR CONTROLLING AN ELECTRONIC DEVICE

TECHNICAL FIELD

The following relates generally to controlling an electronic device using a gesture.

DESCRIPTION OF THE RELATED ART

Many electronic devices, including mobile devices, include one or more touch-sensitive input mechanisms such as a touch-sensitive display or a touch pad to provide inputs to the electronic device. The user can provide an input to the touch-sensitive component using an object (e.g. a finger of a user or a stylus) to perform a gesture near or directly on the surface of the touch-sensitive input mechanism. For example, the gesture can include tapping an object onto a touch-sensitive display or swiping the object across a portion of the touch-sensitive display in a direction. Other gestures can include more than one object to produce multi-touch gestures. For example, a gesture can include placing two objects on a touch-sensitive display and bringing the objects closer together to perform a "pinch" gesture or swiping them in the same direction to perform a two-touch swipe gesture.

BRIEF DESCRIPTION OF THE DRAWINGS

Examples will now be described making reference to the appended drawings wherein:

FIGS. 2 and 3a-3c are schematic diagrams of an example display of a mobile device displaying items from a set of hierarchical data.

FIG. 4 is a block diagram of an example of a wireless communication system.

FIGS. 11-14 are plan views of a display of a mobile device receiving example sets of gestures.

DETAILED DESCRIPTION

Figure 1:
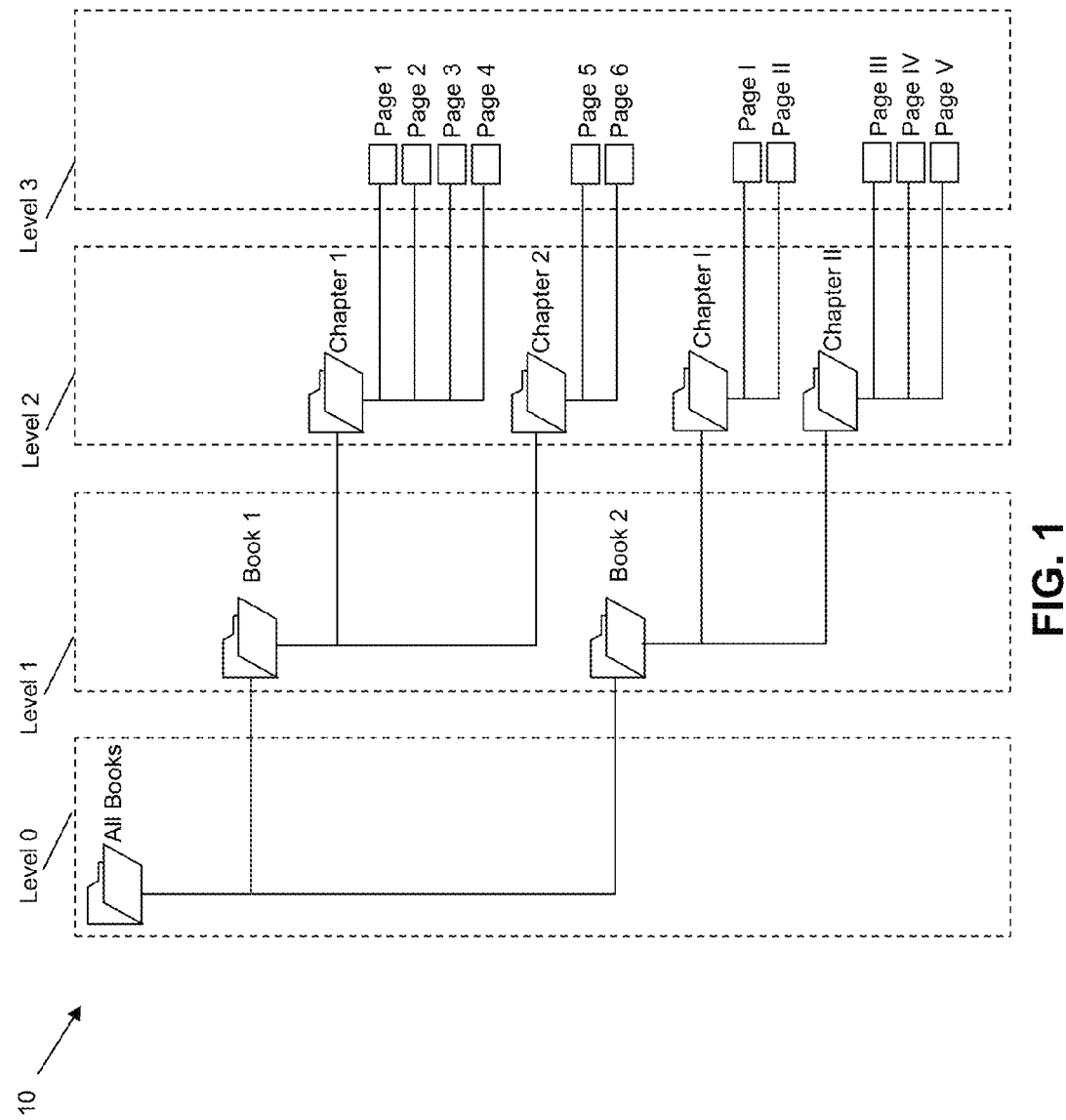
FIG. 1 is an schematic diagram of an example set of hierarchical data.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practised without these specific details. In other instances, well-known methods, procedures and components have not been described in detail so as not to obscure the examples described herein. Also, the description is not to be considered as limiting the scope of the examples described herein.

Various types of data may be organized in a hierarchical manner. For example, an electronic book may include one or more chapters, each chapter including one or more pages. Furthermore, each book may be categorized by author, each author may be categorized by genre (e.g. fiction, non-fiction), etc. In another example, music files can be grouped by album, albums may be grouped by artist, artists may be grouped by genre, etc.

Each categorization of data may create tiers or levels in hierarchically organized data. A user may wish to access hierarchical data based on a specific level. For example, a user may wish to view individual pages of an electronic book in sequence, skip to a different chapter, move to another book by the same author, move to another book in a different genre, etc.

In order to navigate from one location to another location in hierarchical data, it may be necessary to pass through one or more intermediate levels. For example, a user wishing to move from viewing a current page in a current book to another book may have to exit the current page, exit the current chapter, exit the current book, select another book, select the first chapter of the other book, and/or select the first page of the first chapter of the other book. This may be time consuming and inefficient as a user may need to pass through intermediate levels of the hierarchy for which the user may not require information from.

It has been recognized that methods for navigating hierarchical data on electronic devices may be limited. To address this, the following describes a method, computer readable storage medium and mobile device operable to control an electronic device.

In one aspect, there is provided a method of controlling an electronic device. The electronic device operates on hierarchical data. The hierarchical data has a plurality of levels. The method comprises detecting one of a plurality of gestures on a touch-sensitive input mechanism of the electronic device, each of the plurality of gestures associated with a different level in the hierarchical data.

In another aspect, there is provided a computer readable storage medium for controlling an electronic device. The electronic device operates on hierarchical data. The hierarchical data has a plurality of levels. The computer readable storage medium comprises computer executable instructions for detecting one of a plurality of gestures on a touch-sensitive input mechanism of the electronic device, each of the plurality of gestures associated with a different level in the hierarchical data.

In yet another aspect, there is provided an electronic device for operating on hierarchical data. The hierarchical data has a plurality of levels. The electronic device comprises a processor, a touch-sensitive input mechanism and memory. The memory stores computer executable instructions for detecting one of a plurality of gestures on the touch-sensitive input mechanism, each of the plurality of gestures associated with a different level in the hierarchical data.

Referring to FIG. 1, a schematic diagram of an example organization of hierarchical data 10 by an electronic device is provided. In this example, the hierarchical data 10 includes a collection of electronic books. The hierarchical data 10 is categorized into a plurality of levels 0 to 3. Level 0 is the top-most level in the hierarchy and includes all the electronic books accessible by the electronic device. Level 1 is the second highest level in the hierarchy and categorizes the collection of books into individual books. Level 2 is the next level in the hierarchy and categories each book into individual chapters. Level 3 is the lowest level in the hierarchy and categorizes each chapter into its individual pages.

Figure 2:
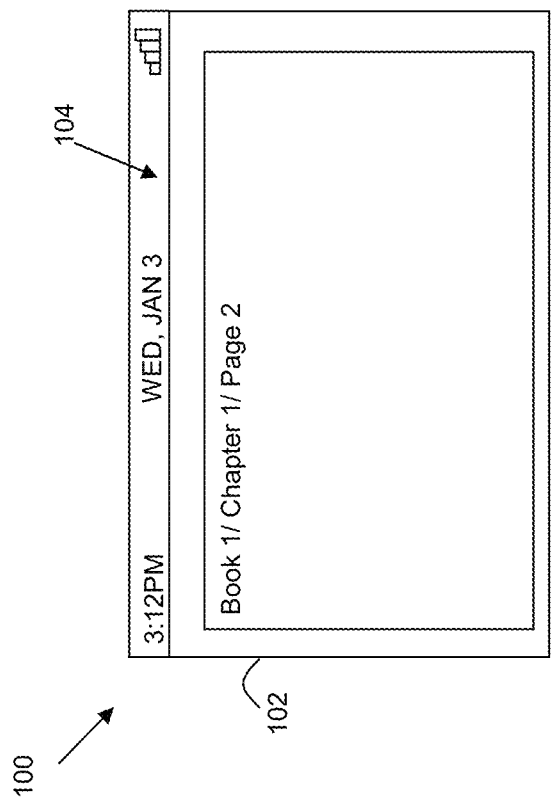

Referring to FIGS. 2 and 3a-3c, schematic diagrams of an electronic device, such as a mobile device 100, having a touch-sensitive display 102 is provided. In FIG. 2, the mobile device 100 accesses the collection of electronic books of FIG. 1 to display a first item on the touch-sensitive display 102 (e.g. page 2 of chapter 1 of book 1). The mobile device 100 may also display a status bar 104 for providing additional information.

In an example embodiment, a gesture may be used to navigate in the hierarchical data 10. In FIGS. 3a-3c, gestures 130a-130c provide a gesture to navigate from a first item (i.e. page 2 of chapter 1 of book 1, FIG. 2) to a different item in the hierarchical data 10. In FIG. 3a, detection of the gesture 130a by the mobile device 100 can be associated with selecting another item in the same level as the current item in the hierarchical data 10. For example, the other item may be the next item relative to the current item, as ordered in the hierarchal data 10. In the example of FIG. 2, the current item is page 2 in level 3. The next item in level 3 is page 3. Therefore, upon detecting the gesture 130a, the mobile device 100 may change from displaying page 2 (FIG. 2) to displaying page 3 (FIG. 3a) without the need to execute a separate command to exit from page 2 and open page 3. In the example of FIG. 3a, the gesture 130a is a single-touch swipe gesture in a rightward direction.

In the example of FIG. 3b, detection of the gesture 130b by the mobile device 100 can be associated with selecting another item in a different category in the level above the current item in the hierarchical data 10. For example, the other item may belong to the next category in the level above the current item. In the example of FIG. 2, the current item of page 2 belongs to the category of chapter 1 in level 2. The next category in level 2 is chapter 2. Therefore, upon detecting the gesture 130b, the mobile device 100 may change from displaying page 2 of chapter 1 to displaying the first page of chapter 2 (i.e. page 5) without the need to execute a separate command to exit from page 2, exit from chapter 1, open chapter 2, and/or open page 6. In the example of FIG. 3b, the gesture 130b is a multi-touch gesture, and specifically a double-touch swipe gesture (i.e. the gesture 130b contacts the touch-sensitive display 102 at two points) in a rightward direction.

In the example of FIG. 3c, detection of the gesture 130c by the mobile device 100 can be associated with selecting another item in a different category two levels above the current item in the hierarchical data 10. For example, the other item may belong to the next category in the level two levels above the current item. In the example of FIG. 2, the current item of page 2 belongs to the category of book 1 in level 1. The next category in level 1 is book 2. Therefore, upon detecting the gesture 130c, the mobile device 100 may change from displaying page 2 of book 1 to displaying the first page of book 2 (i.e. page I) without the need to execute a separate command to exit from page 2, exit from chapter 1, exit from book 1, open book 2, open chapter I and/or open page I. In the example of FIG. 3c, the gesture 130 c is a multi-touch gesture, and specifically a triple-touch swipe gesture (i.e. the gesture 130c contacts the touch-sensitive display 102 at three points) in a rightward direction.

It will be appreciated that the direction of the gestures 130a-130c may be used to determine the other item to be selected. For example, swiping in a leftward direction may be used to select an item that precedes the current item in the hierarchical structure such as a preceding page, chapter, or book, whereas swiping in a rightward direction may be used to select an item that follows the current item in the hierarchical structure such as the next page, chapter or book.

Furthermore, the other item selected in a different category does not need to be limited to the first item in the different category. For example, upon detecting the gesture 130c of FIG. 3c, the electronic device may select the lowest page in book 2 that has not been read by the user or the page last accessed by the electronic device.

It will be also be appreciated that additional gestures may be used to switch categories three levels or more from the current level by performing a gesture involving additional contact points or touches on the touch-sensitive display 102 (e.g. four-touch swipe gesture). It will further be appreciated that the hierarchical data 10 may have any number of levels, each level having any number categories and items.

It can therefore be seen that a single gesture (e.g. gesture 130a, 130b or 130c, hereinafter referred to generally as a gesture 130) can be used to navigate in hierarchically organized data without having to explicitly select intermediate levels, thus avoiding the need to perform multiple inputs. The gesture 130 determines the location in the hierarchical data 10 that is to be selected or modified. A set of related gestures (e.g. gesture 130a, 130b and 130c) may be used to navigate across different levels in the hierarchical data 10. It may be more intuitive to input gestures that are similar to perform commands related to the same set of hierarchical data 10, such as multi-touch gestures that differ in increasing number of touches to navigate across an increasing number of levels in hierarchically organized data. As will be discussed, the mobile device 100 can be configured to associate a set of gestures with a set of levels within the hierarchical data in various ways.

Examples of applicable mobile electronic devices may include, without limitation, cellular phones, smart-phones, tablet computers, wireless organizers, personal digital assistants, computers, laptops, handheld wireless communication devices, wirelessly enabled notebook computers, portable gaming devices, and the like. Such devices will hereinafter be commonly referred to as "mobile devices" 100 for the sake of clarity. It will however be appreciated that the principles described herein are also suitable to other electronic devices, e.g. "non-mobile" devices. For example, the principles herein are equally applicable to personal computers (PCs), tabletop computing devices, wall-mounted screens such as kiosks, or any other computing device.

The mobile device 100 may be a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Referring to FIG. 4, an example communication system 400 is shown. The communication system 400, in this example, enables, at least in part, mobile devices 100 to communicate with each other via a wireless network 402. For example, as shown, data 404 may be exchanged between various mobile devices 100. Data 404 that is sent from one mobile device 100 to another mobile device 100 may be transmitted according to a particular messaging or communication medium, protocol, or other mechanism. For example, as shown in FIG. 4, data 404 may be sent over the wireless network 402 via a component of a network infrastructure 406. The network infrastructure 406 can include various systems that may be used by the mobile devices 100 to exchange data 404. For example, a peer-to-peer (P2P) system, a short message service centre (SMSC), an email system (e.g. web-based, enterprise based, or otherwise), a web system (e.g. hosting a website or web service), a host system (e.g. enterprise server), and social networking system may be provided by or within or be otherwise supported or facilitated by the network infrastructure 406. The mobile devices 100 may therefore send data to or receive data from other mobile devices 100 via one or more particular systems with which the mobile devices 100 are communicable via the wireless network 402 and network infrastructure 406.

Figure 5:
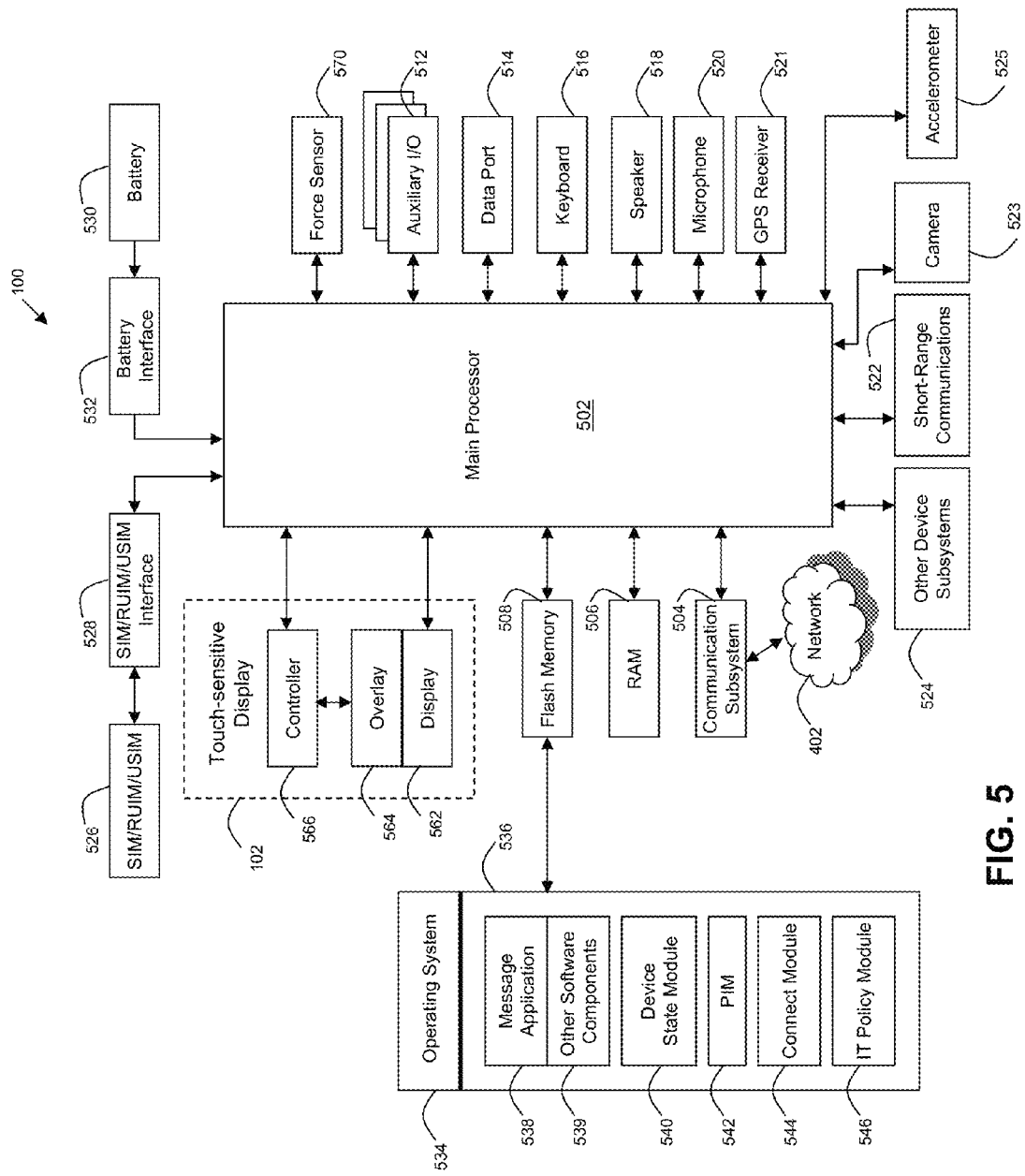
FIG. 5 is a block diagram of an example of a mobile device.

Referring to FIG. 5, a block diagram is provided to aid the reader in understanding an example configuration of a mobile device 100. The mobile device 100 includes a number of components such as a main processor 502 that controls the overall operation of the mobile device 100. Communication functions, including data and voice communications, are performed through a communication subsystem 504. The communication subsystem 504 receives messages from and sends messages to a wireless network 402. In this example of the mobile device 100, the communication subsystem 504 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behaviour described herein, and it will also be understood by persons skilled in the art that the example described herein are intended to use any other suitable standards that are developed in the future. The wireless link connecting the communication subsystem 504 with the wireless network 402 represents one or more different Radio Frequency (RF) channels, operating according to defined protocols specified for GSM/GPRS communications.

The main processor 502 also interacts with additional subsystems such as a Random Access Memory (RAM) 506, a flash memory 508, a touch-sensitive display 102, an auxiliary input/output (I/O) subsystem 512, a data port 514, a keyboard 516, a speaker 518, a microphone 520, a GPS receiver 521, short-range communications 522, a camera 523, a accelerometer 525 and other device subsystems 524. Some of the subsystems of the mobile device 100 perform communication-related functions, whereas other subsystems may provide "resident" or on-device functions. By way of example, the display 102 and the keyboard 516 may be used for both communication-related functions, such as entering a text message for transmission over the network 402, and device-resident functions such as a calculator or task list. In one example, the mobile device 100 can include a non touch-sensitive display in place of, or in addition to, the touch-sensitive display 102

The mobile device 100 can send and receive communication signals over the wireless network 402 after required network registration or activation procedures have been completed. Network access is associated with a subscriber or user of the mobile device 100. To identify a subscriber, the mobile device 100 may use a subscriber module component or "smart card" 526, such as a Subscriber Identity Module (SIM), a Removable User Identity Module (RUIM) and a Universal Subscriber Identity Module (USIM). In the example shown, a SIM/RUIM/USIM 526 is to be inserted into a SIM/RUIM/USIM interface 528 in order to communicate with a network. Without the component 526, the mobile device 100 is not fully operational for communication with the wireless network 402. Once the SIM/RUIM/USIM 526 is inserted into the SIM/RUIM/USIM interface 528, it is coupled to the main processor 502.

The mobile device 100 is typically a battery-powered device and includes a battery interface 532 for receiving one or more rechargeable batteries 530. In at least some examples, the battery 530 can be a smart battery with an embedded microprocessor. The battery interface 532 is coupled to a regulator (not shown), which assists the battery 530 in providing power to the mobile device 100. Although current technology makes use of a battery, future technologies such as micro fuel cells may provide the power to the mobile device 100.

The mobile device 100 also includes an operating system 534 and software components 536 to 546 which are described in more detail below. The operating system 534 and the software components 536 to 546 that are executed by the main processor 502 are typically stored in a persistent store such as the flash memory 508, which may alternatively be a read-only memory (ROM) or similar storage element (not shown). Those skilled in the art will appreciate that portions of the operating system 534 and the software components 536 to 546, such as specific device applications, or parts thereof, may be temporarily loaded into a volatile store such as the RAM 506. Other software components can also be included, as is well known to those skilled in the art.

The subset of software applications 536 that control basic device operations, including data and voice communication applications, may be installed on the mobile device 100 during its manufacture. Software applications may include a message application 538, a device state module 540, a Personal Information Manager (PIM) 542, a connect module 544 and an IT policy module 546. A message application 538 can be any suitable software program that allows a user of the mobile device 100 to send and receive electronic messages, wherein messages are typically stored in the flash memory 508 of the mobile device 100. A device state module 540 provides persistence, i.e. the device state module 540 ensures that important device data is stored in persistent memory, such as the flash memory 508, so that the data is not lost when the mobile device 100 is turned off or loses power. A PIM 542 includes functionality for organizing and managing data items of interest to the user, such as, but not limited to, e-mail, contacts, calendar events, and voice mails, and may interact with the wireless network 402. A connect module 544 implements the communication protocols that are required for the mobile device 100 to communicate with the wireless infrastructure and any host system, such as an enterprise system, that the mobile device 100 is authorized to interface with. An IT policy module 546 receives IT policy data that encodes the IT policy, and may be responsible for organizing and securing rules such as the "Set Maximum Password Attempts" IT policy.

Other types of software applications or components 539 can also be installed on the mobile device 100. These software applications 539 can be pre-installed applications (i.e. other than message application 538) or third party applications, which are added after the manufacture of the mobile device 100. Examples of third party applications include games, calculators, utilities, etc.

The additional applications 539 can be loaded onto the mobile device 100 through at least one of the wireless network 402, the auxiliary I/O subsystem 512, the data port 514, the short-range communications subsystem 522, or any other suitable device subsystem 524.

The data port 514 can be any suitable port that enables data communication between the mobile device 100 and another computing device. The data port 514 can be a serial or a parallel port. In some instances, the data port 514 can be a USB port that includes data lines for data transfer and a supply line that can provide a charging current to charge the battery 530 of the mobile device 100.

For voice communications, received signals are output to the speaker 518, and signals for transmission are generated by the microphone 520. Although voice or audio signal output is accomplished primarily through the speaker 518, the display 102 can also be used to provide additional information such as the identity of a calling party, duration of a voice call, or other voice call related information.

The touch-sensitive display 102 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 102 is a capacitive touch-sensitive display which includes a capacitive touch-sensitive overlay 564. The overlay 564 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 562 of the touch-sensitive display 102 may include a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 102. The processor 502 may determine attributes of the touch, including a location of a touch. Touch location data may include an area of contact or a single point of contact, such as a point at or near a center of the area of contact, known as the centroid. A signal is provided to the controller 566 in response to detection of a touch. A touch may be detected from any suitable object, such as a finger, thumb, appendage, or other items, for example, a stylus, pen, or other pointer, depending on the nature of the touch-sensitive display 102. The location of the touch moves as the detected object moves during a touch. The controller 566 and/or the processor 502 may detect a touch by any suitable contact member on the touch-sensitive display 102. Similarly, multiple simultaneous touches, are detected.

One or more gestures are also detected by the touch-sensitive display 102. A gesture is a particular type of touch on a touch-sensitive display 102 that begins at an origin point and continues to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture.

An example of a gesture is a swipe (also known as a flick). A swipe has a single direction. The touch-sensitive overlay 564 may evaluate swipes with respect to the origin point at which contact is initially made with the touch-sensitive overlay 564 and the end point at which contact with the touch-sensitive overlay 564 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 564 to initialize the gesture, a horizontal movement of the detected object from the origin point to an end point towards the right or left side of the touch-sensitive overlay 564 while maintaining continuous contact with the touch-sensitive overlay 564, and a breaking of contact with the touch-sensitive overlay 564. Similarly, a vertical swipe typically comprises an origin point towards the top or bottom of the touch-sensitive overlay 564 to initialize the gesture, a horizontal movement of the detected object from the origin point to an end point towards the bottom or top of the touch-sensitive overlay 564 while maintaining continuous contact with the touch-sensitive overlay 564, and a breaking of contact with the touch-sensitive overlay 564.

Swipes can be of various lengths, can be initiated in various places on the touch-sensitive overlay 564, and need not span the full dimension of the touch-sensitive overlay 564. In addition, breaking contact of a swipe can be gradual in that contact with the touch-sensitive overlay 564 is gradually reduced while the swipe is still underway.

Meta-navigation gestures may also be detected by the touch-sensitive overlay 564. A meta-navigation gesture is a gesture that has an origin point that is outside the display area of the touch-sensitive overlay 564 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 564. Thus, two fingers may be utilized for meta-navigation gestures. Further, multi-touch meta-navigation gestures may be distinguished from single touch meta-navigation gestures and may provide additional or further functionality.

In some examples, an optional force sensor 570 or force sensors is disposed in any suitable location, for example, between the touch-sensitive display 102 and a back of the mobile device 100 to detect a force imparted by a touch on the touch-sensitive display 102. The force sensor 570 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 6:
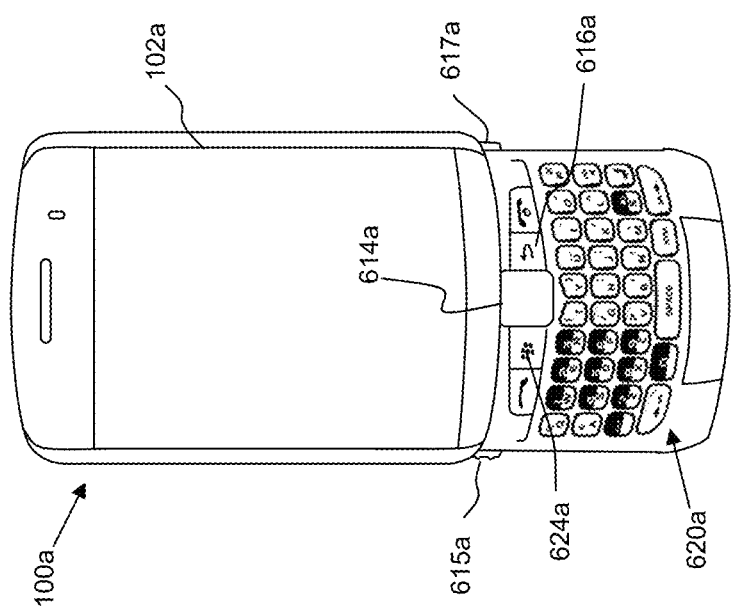
FIG. 6 is a plan view of an example mobile device and a display screen therefor.
Figure 7:
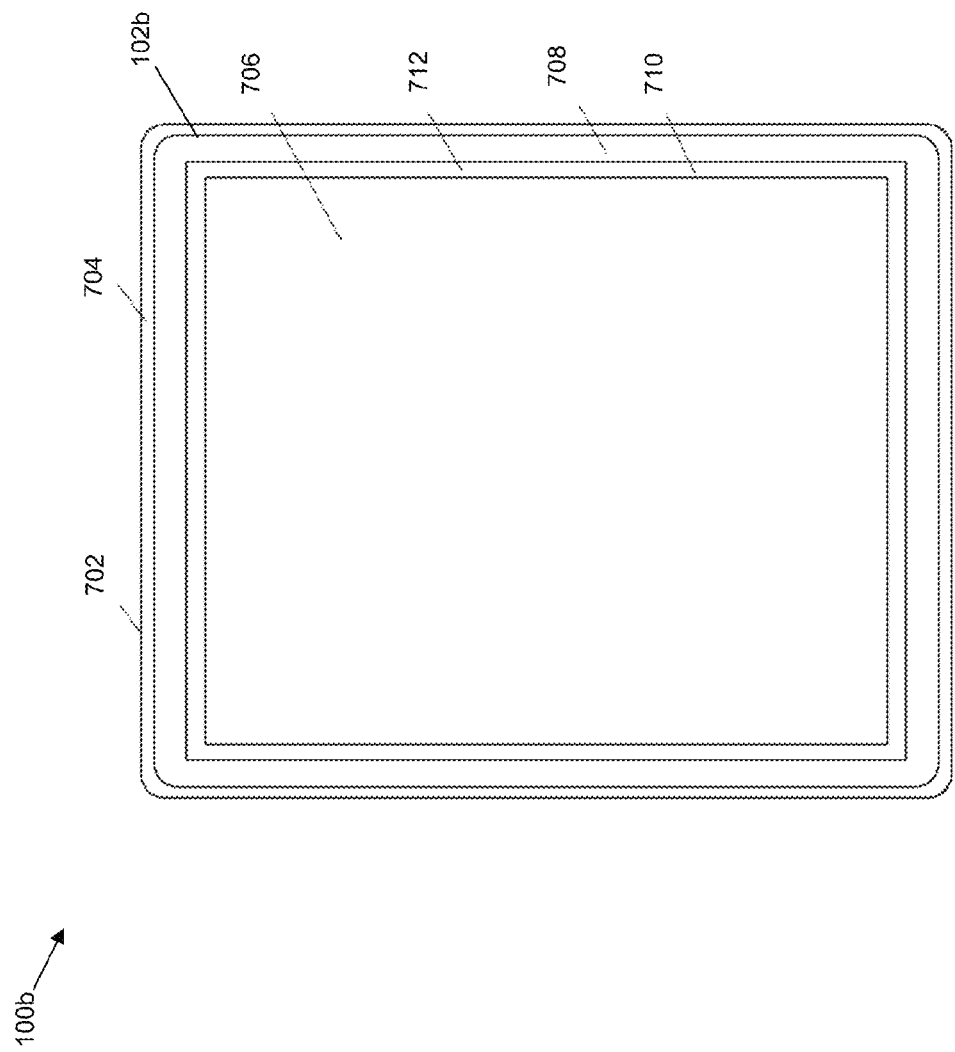
FIG. 7 is a plan view of another example mobile device and a display screen therefor.

Referring to FIGS. 6 and 7, one example of a mobile device 100a is shown in FIG. 6 and another example of a mobile device 100b is shown in FIG. 7. It will be appreciated that the numeral "100" will hereinafter refer to any mobile device 100, including the examples 100a and 100b, those examples enumerated above or otherwise. It will also be appreciated that a similar numbering convention may be used for other general features common between all figures.

The mobile device 100a shown in FIG. 6 includes a touch-sensitive display area and a cursor or positioning device, which in this example is in the form of a trackpad 614a. Trackpad 614a. In this example, the touch-sensitive display area can span the entire touch-sensitive display 102a. The trackpad 614a permits multi-directional positioning of a selection indicator or cursor that can be displayed on the touch-sensitive display 102a such that the selection cursor can be moved in an upward, downward, left and right direction, and if desired and/or permitted, in any diagonal direction. A selection cursor may include a box, alteration of an icon or any combination of features that enable the user to identify the currently chosen icon or item. The trackpad 614a in this example is situated on the front face of a housing for mobile device 100a to enable a user to maneuver the trackpad 614a while holding the mobile device 100a in one hand. The trackpad 614a may serve as another input member (in addition to a directional or positioning member) to provide selection inputs to a processor of the mobile device and can preferably be pressed in a direction towards the housing of the mobile device 100a to provide such a selection input. It will be appreciated that the trackpad 614a is only one example of a suitable positioning device. For example, a trackball, touch-sensitive display, OLED, or other input mechanism may equally apply.

The mobile device 100a in FIG. 6 also includes a programmable convenience button 615a to activate a selection application such as, for example, a calendar or calculator. Further, mobile device 100a also includes an escape or cancel button 616a, a camera button 617a, a menu or option button 624a and a keyboard 620a. The camera button 617a is able to activate photo and video capturing functions, e.g. when pressed in a direction towards the housing. The menu or option button 624a can be used to load a menu or list of options on the display 102 when pressed. In this example, the escape or cancel button 616a, the menu option button 624a, and a keyboard 620a are disposed on the front face of the mobile device housing, while the convenience button 615a and camera button 617a are disposed at the side of the housing. This button placement enables a user to operate these buttons while holding the mobile device 100a in one hand. The keyboard 620a is, in this example, a standard QWERTY keyboard, however, it will be appreciated that reduced QWERTY or virtual keyboards (e.g. as provided by a touch-sensitive display) may equally apply It will be appreciated that for the mobile device 100, a wide range of one or more positioning or cursor/view positioning mechanisms such as a touch/track pad, a positioning wheel, a joystick button, a mouse, a touch-sensitive display, a set of arrow keys, a tablet, an accelerometer (for sensing orientation and/or movements of the mobile device 100 etc.), OLED, or other whether presently known or unknown may be employed. Similarly, any variation of keyboard 620a may be used. It will also be appreciated that the mobile devices 100 shown in FIGS. 6 and 7 are for illustrative purposes only and various other mobile devices 100 are equally applicable to the following examples. Other buttons may also be disposed on the mobile device housing such as colour coded "Answer" and "Ignore" buttons to be used in telephonic communications.

A front view of an example of the mobile device 100b is shown in FIG. 7. The mobile device 100b includes a housing 702 that encloses components such as shown in FIG. 3. The housing 702 may include a back, sidewalls, and a front 704 that frames the touch-sensitive display 102. The example mobile device 100b shown in FIG. 7 can represent a portable tablet computer or other handheld or otherwise portable device.

In the shown example of FIG. 7, the touch-sensitive display 102b is generally centered in the housing 702 such that a display area 706 of the touch-sensitive overlay 564 is generally centered with respect to the front 704 of the housing 702. The non-display area 708 of the touch-sensitive overlay 564 extends around the display area 706.

For the purpose of the present example, the touch-sensitive overlay 564 extends to cover the display area 706 and the non-display area 708. Touches on the display area 706 may be detected and, for example, may be associated with displayed selectable features. Touches on the non-display area 708 may be detected, for example, to detect a meta-navigation gesture. Alternatively, meta-navigation gestures may be determined by both the non-display area 708 and the display area 706. The density of touch sensors may differ from the display area 706 to the non-display area 708. For example, the density of nodes in a mutual capacitive touch-sensitive display, or density of locations at which electrodes of one layer cross over electrodes of another layer, may differ between the display area 706 and the non-display area 708.

Gestures received on the touch-sensitive display 102b may be analyzed based on the attributes to discriminate between meta-navigation gestures and other touches, or non-meta navigation gestures. Meta-navigation gestures may be identified when the gesture crosses over a boundary near a periphery of the display 562, such as a boundary 710 between the display area 706 and the non-display area 708. In the example of FIG. 7, the origin point of a meta-navigation gesture may be determined utilizing the area of the touch-sensitive overlay 564 that covers the non-display area 708.

A buffer region 712 or band that extends around the boundary 710 between the display area 706 and the non-display area 708 may be utilized such that a meta-navigation gesture is identified when a touch has an origin point outside the boundary 710 and the buffer region 712 and crosses through the buffer region 712 and over the boundary 710 to a point inside the boundary 710. Although illustrated in FIG. 7, the buffer region 712 may not be visible. Instead, the buffer region 712 may be a region around the boundary 710 that extends a width that is equivalent to a predetermined number of pixels, for example. Alternatively, the boundary 710 may extend a predetermined number of touch sensors or may extend a predetermined distance from the display area 706. The boundary 710 may be a touch-sensitive region or may be a region in which touches are not detected.

Gestures that have an origin point in the buffer region 712, for example, may be identified as non-meta navigation gestures. Optionally, data from such gestures may be utilized by an application as a non-meta navigation gesture. Alternatively, data from such gestures may be discarded such that touches that have an origin point on the buffer region 712 are not utilized as input at the mobile device 100.

Figure 8:
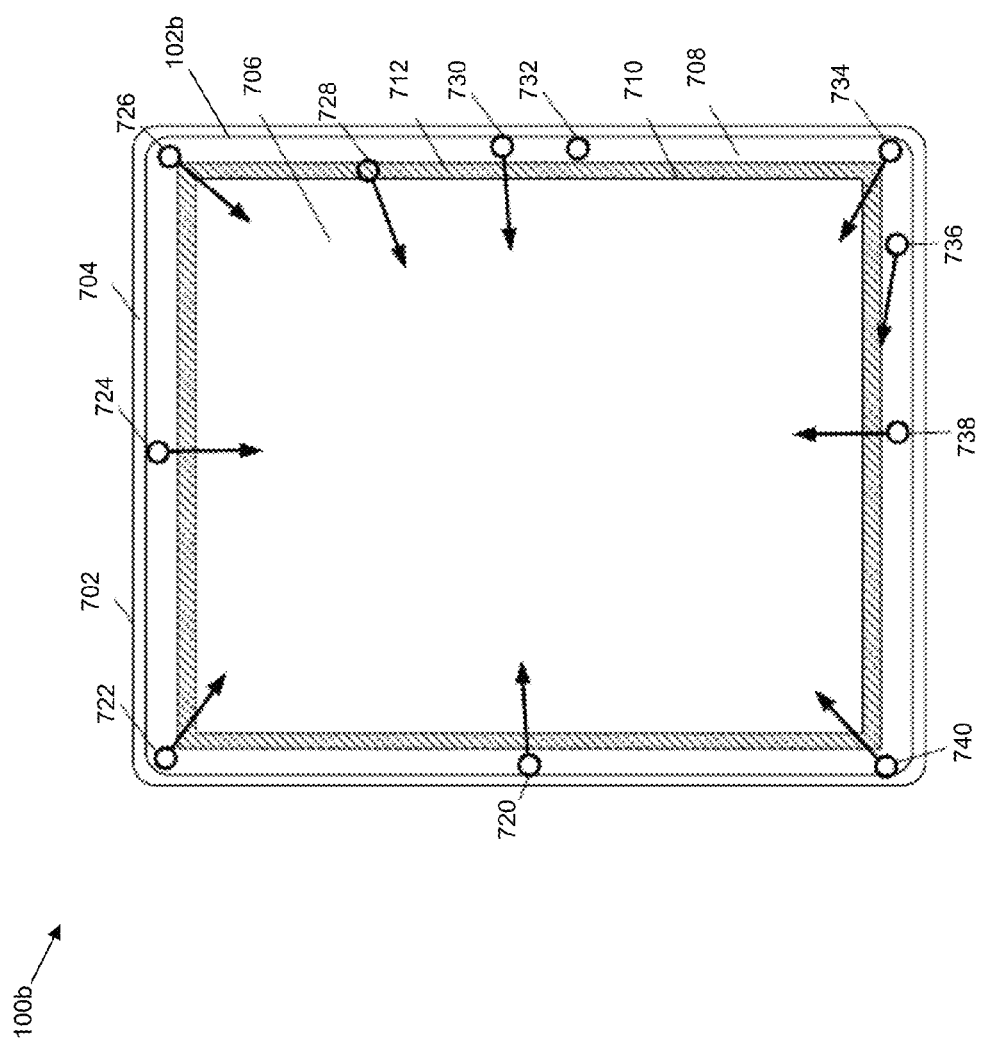
FIG. 8 is a plan view of examples of gestures on the mobile device of FIG. 7.

FIG. 8 illustrates examples of touches on the touch-sensitive display 102b. The buffer region 712 is illustrated in FIG. 8 by hash markings for the purpose of explanation. As indicated, the buffer region 712 may not be visible to the user. For the purpose of explanation, touches are illustrated by circles at their points of origin. Arrows extending from the circles illustrate the paths of the touches that are gestures.

The touch 738 begins at the origin point outside the boundary 710 and outside the buffer region 712. The path of the touch 738 crosses the buffer region 712 and the boundary 710 and is therefore identified as a meta-navigation gesture. Similarly, the touches 720, 730, 724, 722, 726, 740, 734 each have origin points outside the boundary 710 and the buffer region 712 and their paths cross the buffer region 712 and the boundary 710. Each of the touches 720, 730, 724, 722, 726, 740, 734 is therefore identified as a meta-navigation gesture. The touch 728, however, has an origin point that falls within the buffer region 712 and the touch 728 is therefore not identified as a meta-navigation gesture. The touch 736 begins at an origin point outside the boundary 710 and the buffer region 712. The path of the touch 736, however, does not cross the boundary 710 and is therefore not identified as a meta-navigation gesture. The touch 732 also has an origin point outside the boundary 710 and the buffer region 712 but is not a gesture and therefore does not cross the boundary 710 and is not identified as a meta-navigation gesture.

Figure 9:
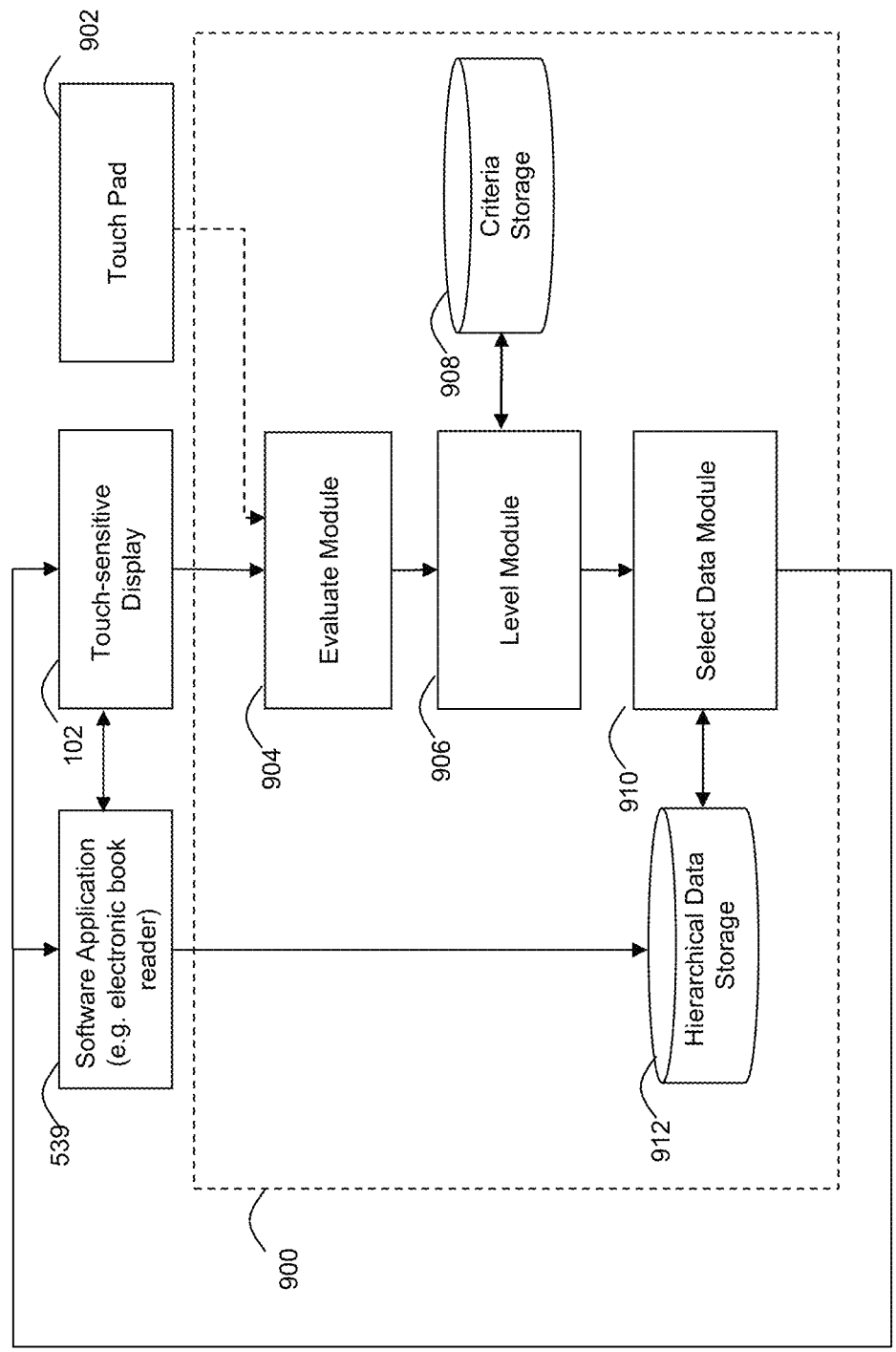
FIG. 9 is a block diagram of an example configuration of a gesture input application.

Referring to FIG. 9, an example of a configuration for gesture input application 900 is provided. The gesture input application 900 can be one of the other software applications 539 of FIG. 5 that can be loaded on the mobile device 100. The gesture input application 900 can request details of activity occurring in, or receive inputs from, a component that can receive gestures 130, such as a touch-sensitive display 102, for example. It will be appreciated that other touch-sensitive input mechanisms can be used in replacement of, or in addition to, the touch-sensitive display 102 to provide gestures 130 to the gesture input application 900, such as touch pad 902. The gesture input application 900 can also request details of activity occurring in, or receive inputs from, a software application 539 (e.g. electronic book reader) that is using the hierarchical data 10. The gesture input application 900 can send a command or otherwise indicate to the software application 539 the item that is selected in response to the gesture 130.

The gesture input application 900 in the example of FIG. 9 includes an evaluate module 904 for receiving a gesture 130 performed on the touch-sensitive display 102 and for evaluating one or more properties of the gesture 130. The gesture input application 900 includes a level module 906 for determining a level within the hierarchal data 10 that is associated with the gesture 130 and a criteria storage 908 for storing criteria used in making such a determination. The gesture input application 900 also includes a select data module 910 for determining the data to select from the hierarchical data 10 based on the gesture 130 and sending the selected data to the software application 539. The hierarchical data 10 may be provided by the software application 539 and stored in the hierarchical data storage 912 of the gesture input application 900.

The evaluate gesture module 904 receives a gesture 130 from the touch-sensitive display 102 and determines various properties associated with the gesture 130 such as the number of touches, length, origin point, end point, path, duration, orientation, pressure, etc.

The level module 906 receives information on a gesture 130 and uses the information to determine the level within the hierarchical data 10 that the gesture 130 is associated with. For example, the number of touches of a gesture 130, as detected by the evaluate gesture module 904, can be used to determine a specific level within which a category in the hierarchical data 10 is to be selected from. In the example of FIG. 9, the level module 906 can retrieve criteria used to determine the level of the hierarchical data 10 associated with a gesture 130 from the criteria storage 908.

The select data module 910 can select an item in the hierarchical data 10 based on the level of the hierarchical data associated with the gesture 130 and send or otherwise indicate the selected item to the software application 539 using the hierarchical data 10.

It will be appreciated that any module, subsystem component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 or accessible or connectable thereto. Any application or module herein described may be implemented using computer readable/executable instructions or operations that may be stored or otherwise held by such computer readable media.

Figure 10:
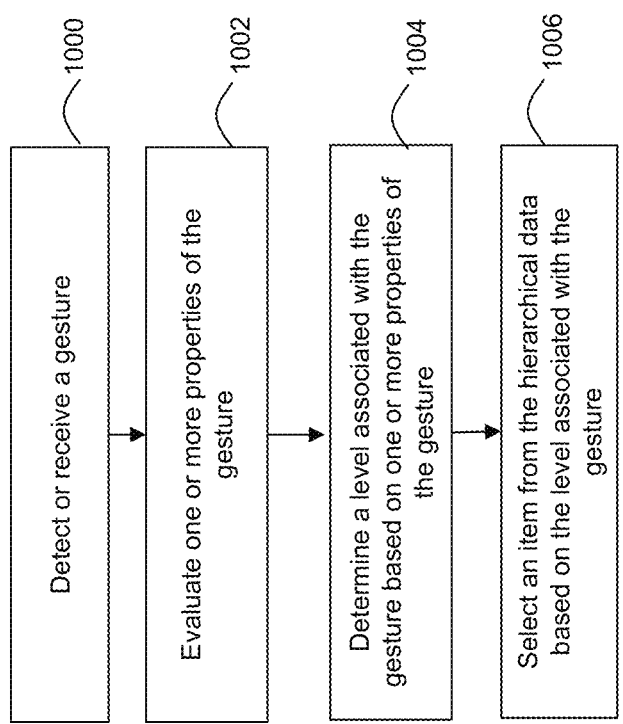
FIG. 10 is a flow diagram of example computer executable instructions for controlling a mobile device using gestures.

Referring to FIG. 10, an example set of computer executable instructions is provided for controlling an electronic device, such as a mobile device 100. At block 1000, a gesture 130 is received on or detected by a touch-sensitive input mechanism, such as the touch-sensitive display 102, of the mobile device 100. At block 1002, one or more properties of the gesture 130 are determined. At block 1004, one or more properties of the gesture 130 are used to determine the level in the hierarchical data associated with the gesture 130. At block 1006, an item from the hierarchical data based on the level associated with the gesture 130 is selected.

As noted above, at block 1000, a gesture 130 is received or detected from a touch-sensitive input mechanism. In an example configuration of the gesture input application 900, the touch-sensitive display 102 or a touch pad 902 may implement block 1000 (FIG. 10).

At block 1002, one or more properties of the gesture 130 are determined such as the number of touches, length, origin point, end point, path, duration, orientation, pressure, etc. In an example configuration of the gesture input application 900, the evaluate module 904 may implement block 1002 (FIG. 10). In one example, the origin point, end point, and one or more intermediate points, for each touch, can be determined to identify the length, orientation and path of the gestures 130a-130b of FIGS. 3a-3b. It will be appreciated that a variety of other properties of the gesture 130 can be determined.

At block 1004, one or more properties of the gesture 130 can be used to determine a level within the hierarchical data 10 that the gesture 130 is associated with. In the example configuration of the gesture input application 900, the level module 906 may implement block 1004 (FIG. 9). The criteria used to determine the level associated with a gesture 130 may be stored in the criteria storage module 908. In one example, the number of touches of the gesture 130 may be used to determine the level associated with the gesture 130 and specifically, the level associated with the gesture 130 is equal to the number of touches minus one above the current level. In the example of FIG. 3b, the current level is 3, the number of touches of gesture 130b is two, and thus the level associated with the gesture 130 is one level above the current level, which is level 2.

Figure 11:
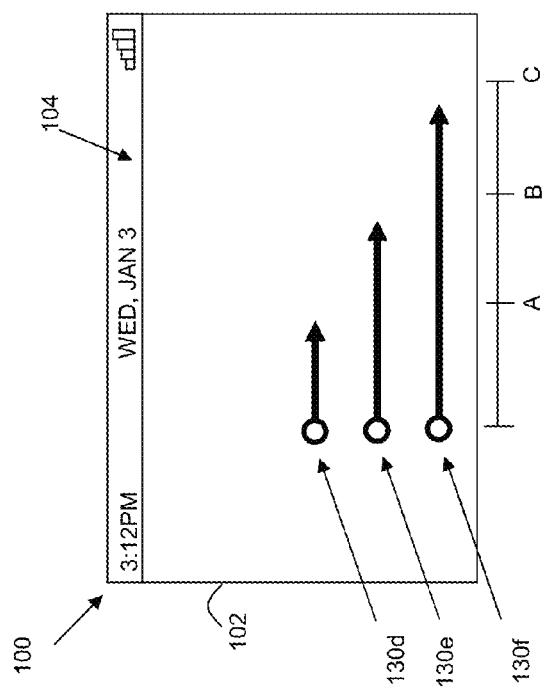

In another embodiment, the length of a gesture 130 can determine the level associated with the gesture 130. In the example of FIG. 11, a gesture 130d with a length less than a predetermined threshold A is associated with a level (e.g. the level of the current item selected), a gesture 130e with a length greater than the predetermined threshold A but less than a predetermined threshold B is associated with a different level (e.g. one level above the current level) and a gesture 130f with a length greater than the predetermined threshold B but less than a predetermined threshold C is associated with a level different from that of both gestures 130d, 130e (e.g. two levels above the current level).

Figure 12:
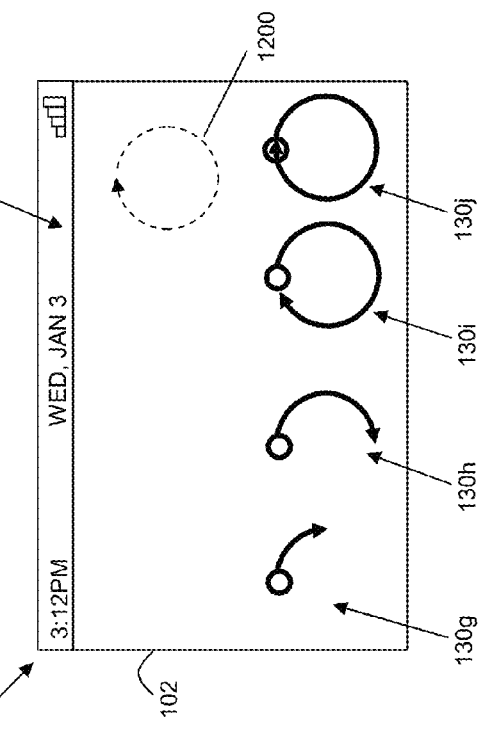

In another embodiment, the portion of a path completed by a gesture 130 can determine the level associated with the gesture 130. In the example of FIG. 12, a gesture 130g completing a quarter of the path 1200 is associated with a level (e.g. the level of the current item selected), a gesture 130h completing half of the path 1200 is associated with a different level (e.g. one level above the current level) and a gesture 130i completing the path 1200 is associated with a level different from that of both gestures 130g, 130h (e.g. two levels above the current level). In yet another embodiment, the number of repetitions of a closed ended path (such as the closed circular path 1200) completed by a gesture may be used. For example, the number of the circular paths 1200 completed by a gesture 130j may indicate the number of levels above the current level that the gesture 130j is associated with.

In another embodiment, the location a gesture 130 on the touch-sensitive display 102 can determine the level associated with the gesture 130. In the example of FIG. 13, the touch-sensitive display 102 of the mobile device 100 includes a touch-sensitive non-display area 1124 surrounding a touch-sensitive display area 1122, both of which are capable of receiving inputs in the form of gestures. The touch-sensitive display area 1122 and the touch-sensitive non-display area 1124 are examples of a display area 706 of the touch-sensitive overlay 564 and a non-display area 708 of the touch-sensitive overlay 564, respectively.

In this example, a gesture 130k contained within a predetermined region of the touch-sensitive display 102, such as the touch-sensitive non-display area 1124, is associated with a level (e.g. the current level), a gesture 130l originating from the touch-sensitive non-display area 1124 and ending in the touch-sensitive display area 1122 is associated with a different level (e.g. one level above the current level) and a gesture 130m spanning one side of the touch-sensitive non-display area 1124 to the other side of the touch-sensitive non-display area 1124 is associated with a level different from that of both gestures 130k, 130l (e.g. two levels above the current level). It will be appreciated that the touch-sensitive non-display area 1124 and/or touch-sensitive display area 1122 can be divided into further regions. In yet another embodiment, the number of display region boundaries crossed over by a gesture 130 can be used to determine the level associated with the gesture.

Figure 14:
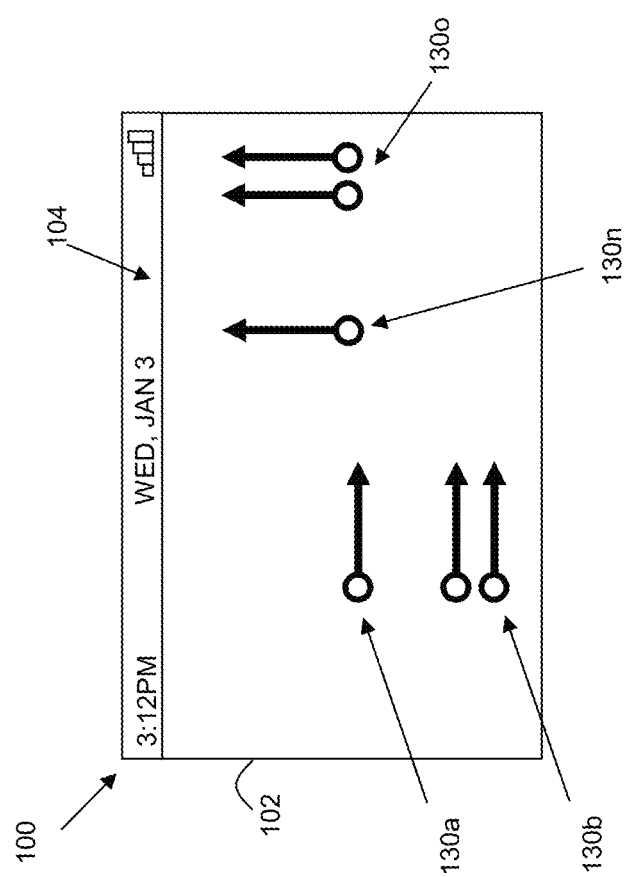

In another embodiment, the orientation of a gesture 130 can be used to determine the level associated with the gesture 130. In the example of FIG. 14, horizontal swipe gestures 130a and 130b are associated with the current level and one level above the current level, respectively. However, instead of using a three-touch swipe gesture, such as 130c, a vertical swipe gesture 130n may be associated with two levels above the current level and a two-touch vertical swipe gesture 130o may be associated with three levels above the current level. Associating gestures 130a, 130b, 130n and 130o with four consecutive levels can avoid the need for three-touch and four-touch swipe gestures which may be difficult to detect by the mobile device 100 and/or cumbersome to perform by a user. It will be appreciated that any combination of different types of gestures and/or different orientations of gestures, such as the gestures described in FIGS. 11-14, may be associated with the levels in hierarchical data. Using different types of gestures may enable the mobile device 100 to support a larger number of levels in the hierarchical data by incorporating more distinguishing features that can be recognized by the mobile device 100.

Referring back to FIG. 10, at block 1006, an item from the hierarchical data is selected based on the level associated with the gesture 130. In the example configuration of the gesture input application 900, the select data module 906 may implement block 1006 (FIG. 9). In one example, the direction of the gesture 130 can be used, in combination with the level associated with the gesture, to select an item in the hierarchical data 10. In the example of FIG. 3a, a rightward swipe gesture 130a-130c selects the next page, chapter and book, respectively. In another example, a leftward swipe gesture can select the preceding page, chapter or book. It can be appreciated that the mobile device 100 may use any direction of a gesture, such as leftward/rightward, upward/downwards, diagonal, clockwise/counter clockwise, etc., to determine an item to select in the hierarchical data 10. Incorporating the direction of the gesture to select an item may make the gestures more intuitive as certain directions, such as rightward and leftward, are typically associated with moving forward and backwards, respectively.

The gesture input application 900 causes an item to be selected from a different category than that of the current item. There may be multiple categories in the level associated with the gesture 130 and within a category, multiple items to select from. In one example, the gesture input application 900 may select the first different category and first item in the different category, in the order set out in the hierarchical data (e.g. first page in the first book after book 1 in response to gesture 130c). It will be appreciated that the gesture input application 900 may select an item in the different category based on other suitable criteria, such as the lowest page in the first unread book, for example. In another example, where the hierarchical data may be multimedia data such as movies, tv shows, music, etc., other criteria may include selecting an item in a different category sequentially, randomly or based on a rating or other data associated with an item or category, such as the item last accessed in that category.

As discussed in FIG. 1, an example set of hierarchical data 10 can include a collection of books categorized into individual books, chapters and pages. Further categories can include year, author, genre, etc. It will be appreciated that other types of hierarchical data 10 may can include multimedia data such as video and audio data, photos and any other type of data that is hierarchically organized, including different types of files grouped together into folders and subfolders in a file management application.

Figure 15:
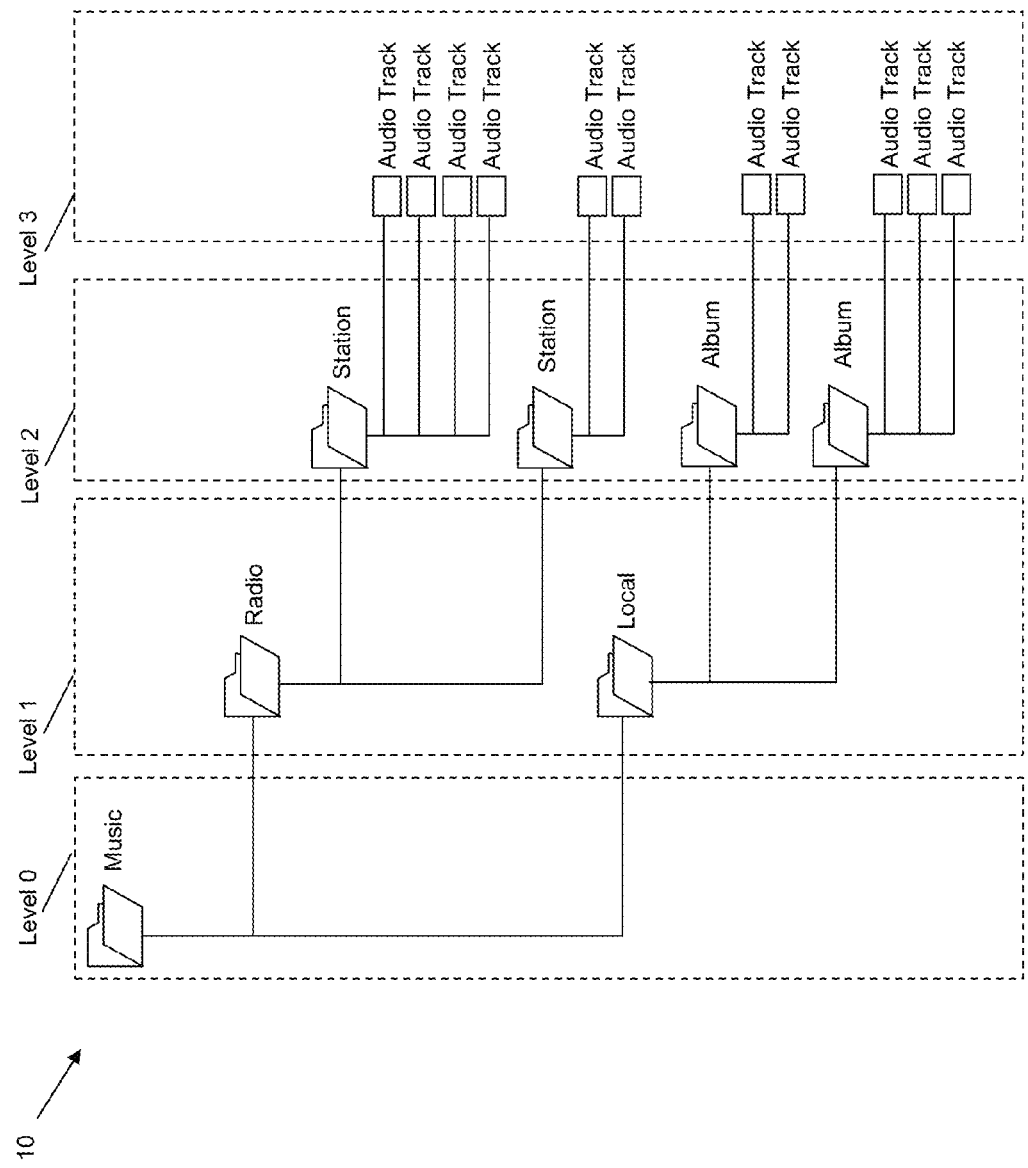
FIG. 15 is an schematic diagram of another example set of hierarchical data.

In the example of FIG. 15, the hierarchical data 10 includes audio data accessible by the mobile device 100. For example, the mobile device 100 may be able to access multiple sources of audio data such as radio (e.g. traditional, satellite and/or internet), and locally accessible audio data (e.g. media files stored in memory, compact discs, USB drives, etc). Radio data can be further categorized into stations, each station containing audio tracks that are played by that station. Similarly, locally stored audio data may be categorized into albums or playlists, each album or playlist containing audio tracks.

Figure 16:
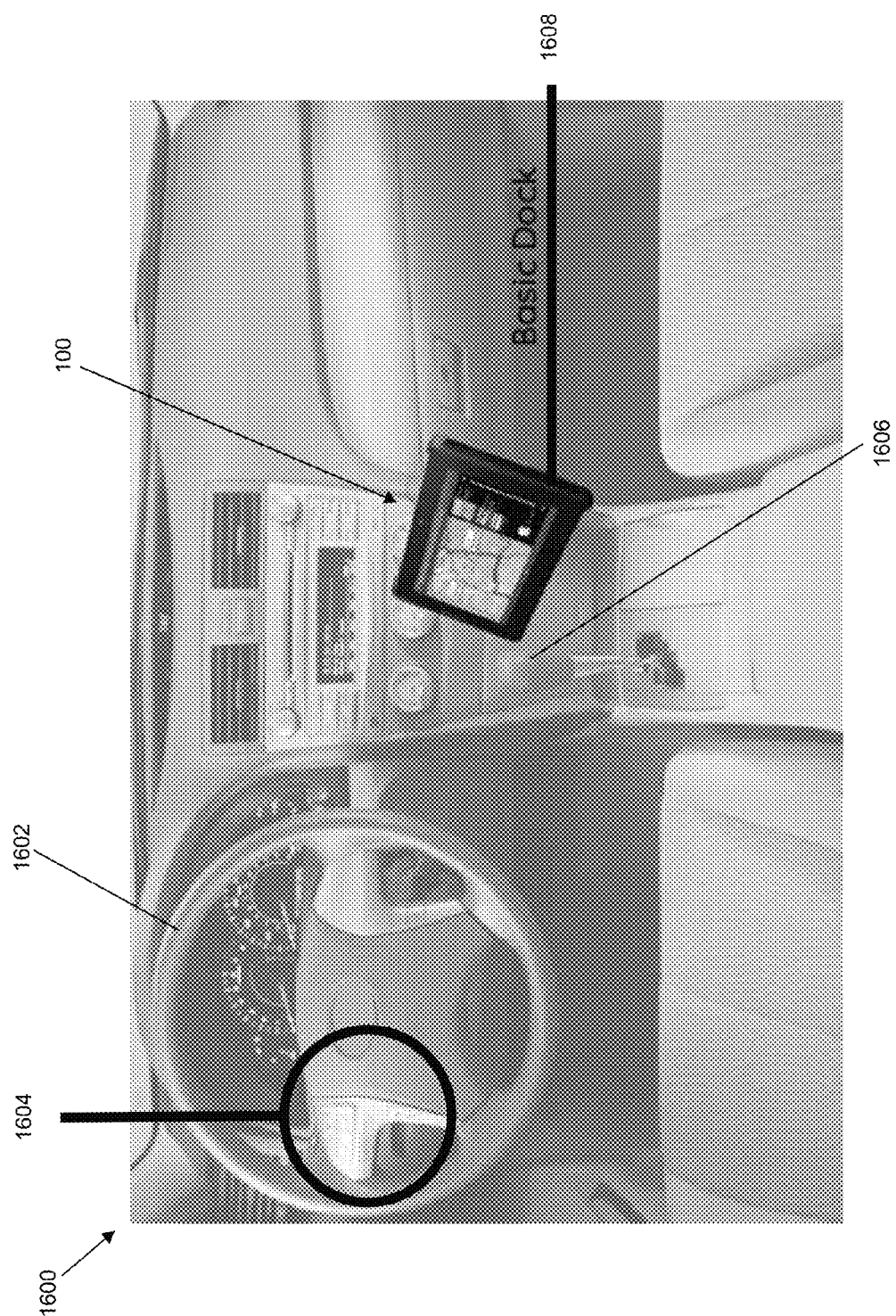
FIGS. 16-18 are front views of examples of a dashboard of an automotive vehicle with a mobile device mounted thereon.
Figure 17:
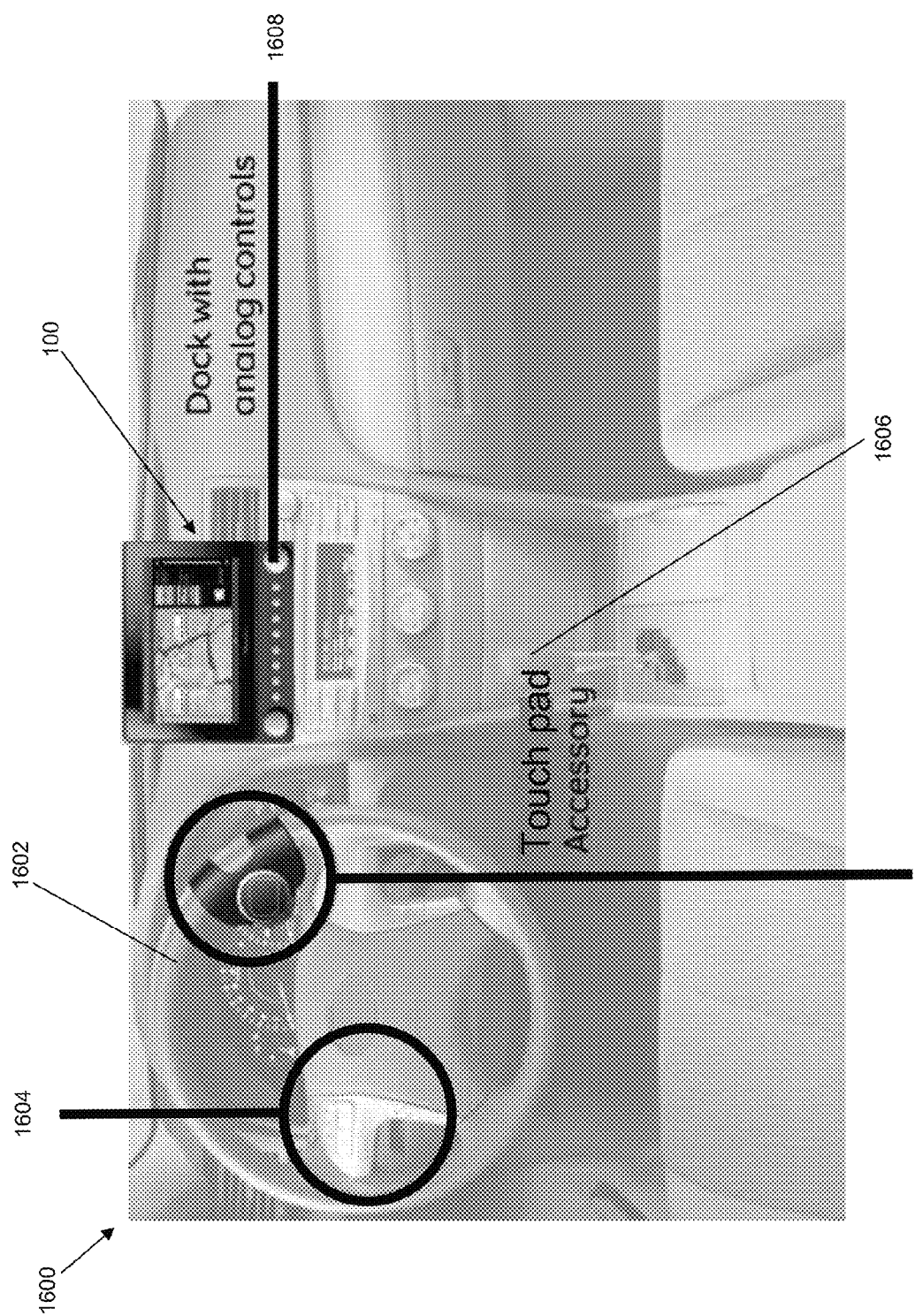
Figure 18:
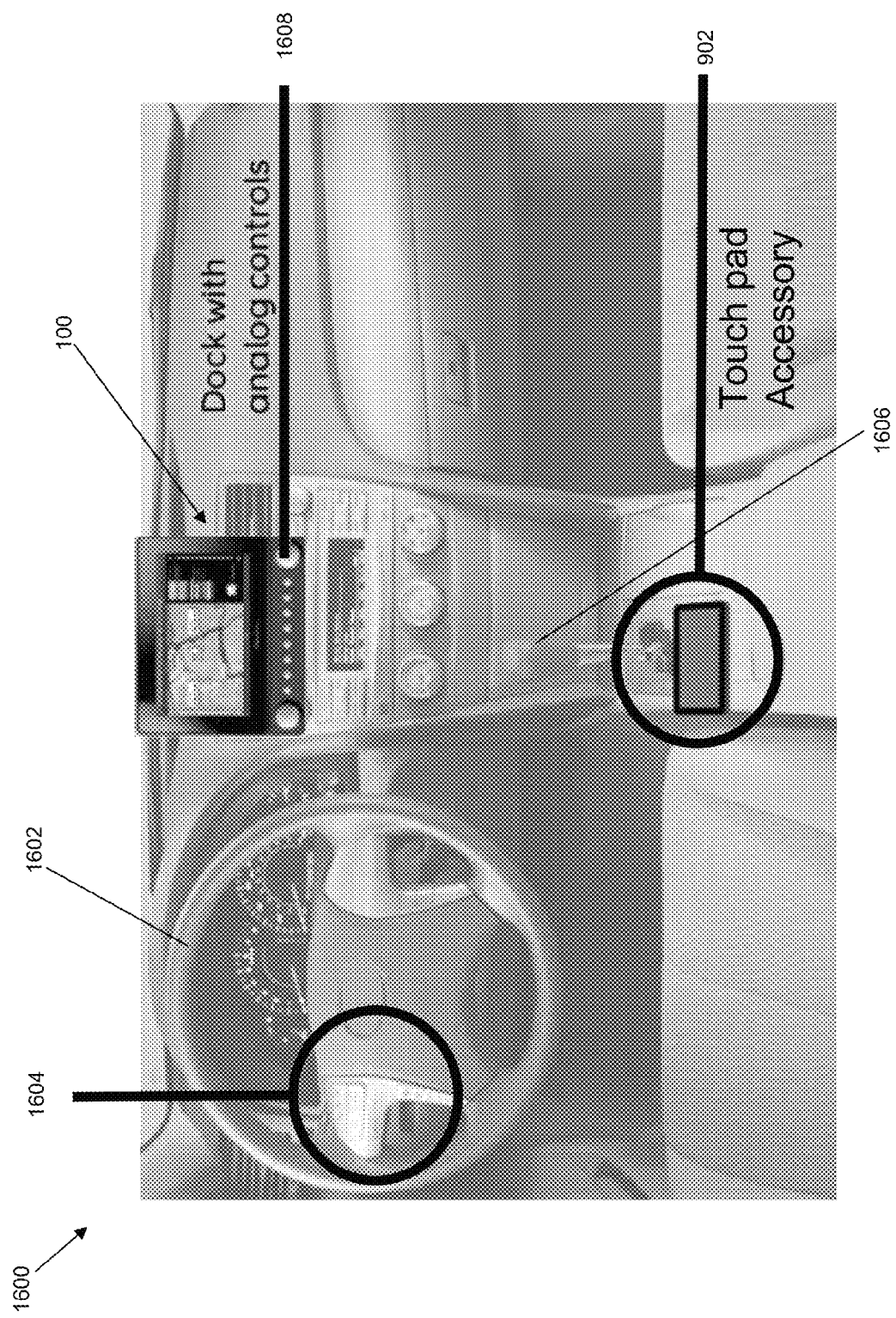

As shown in FIGS. 16-18, a mobile device 100 can be mounted or docked on or near a dashboard of an automotive vehicle 1600. The mobile device 100 may communicate with an electronic system of the automotive vehicle through a wireless connection (e.g. Bluetooth) or a wired connection (e.g. through a port provided in the docking station). The dashboard 1600 includes a steering wheel 1602 which may include a number of control buttons 1604. At the base of the dashboard 1600 also includes a transmission shifter 1606.

In the example of FIG. 16, a mobile device 100 can be mounted near the transmission shifter 1606 in a dock 1608 so that the touch-sensitive display 102 of the mobile device 100 can be easily accessed by a driver. In another embodiment, a touch pad 902 in communication with the mobile device 100 (e.g. through Bluetooth) may be placed in a convenient location to the driver so that gestures can be easily inputted to the mobile device 100, via the touch pad 902, while the mobile device 100 can be placed in a different position easily viewable by the driver while facing the forward. For example, the touch pad 902 can be placed on a portion of the steering wheel (FIG. 17) or near the base of the transmission shifter (FIG. 18).

The gesture input application 900 may provide a substantially eyes free operation as the user merely needs to locate the touch-sensitive input mechanism (e.g. touch-sensitive display 102 or touch pad 902) and perform a gesture 130 on the touch-sensitive input mechanism to control the mobile device 100. In the example of a mobile device 100 running an audio multimedia player, the mobile device 100 can play the item selected without displaying content on the touch-sensitive display 102. This may reduce the visual distraction caused by operation of the touch-sensitive display 102. In another example, the touch-sensitive display 102 may be free to display other information, unrelated to the audio data being played by the mobile device 100, such as GPS data or a map.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific examples, various modifications thereof will be apparent to those skilled in the art as outlined in the appended claims.

The invention claimed is:

1. A method of controlling an electronic device, the electronic device operating on hierarchical data, the hierarchical data comprising at least two levels, the at least two levels each comprising at least one respective category, where each respective category in the at least two levels comprises at least one respective sub-category within a lower level in the hierarchical data, the method comprising:
  detecting a gesture of a plurality of gestures on a touch-sensitive input mechanism of the electronic device, each gesture in the plurality of gestures indicating a different respective number of hierarchical levels within hierarchical data, the gesture being independent of a presentation on the touch-sensitive input mechanism and maintaining continuous contact with the touch-sensitive input mechanism for the duration of the gesture; and
  selecting a second item within the hierarchical data based on detecting the gesture while a first item is selected,
    where the first item is within a current hierarchical level within the hierarchical data,
    the first item being within a first category defined within a second hierarchical level that is above the current hierarchical level within the hierarchical data,
    the second item being within a second category defined within the second hierarchical level where the second category is different from the first category, and
    the second hierarchical level and the current hierarchical level being separated in the hierarchical data by one or more intermediate levels equal to the respective number of hierarchical levels indicated by the gesture.

2. The method of claim 1, wherein each of the plurality of gestures comprises a different number of simultaneous contact points maintaining continuous contact with the touch-sensitive input mechanism.

3. The method of claim 1, wherein each of the plurality of gestures comprises a different portion of a path.

4. The method of claim 1, wherein each of the plurality of gestures comprises a different number of repetitions of continuous contact movements over a path.

5. The method of claim 2, wherein the touch-sensitive input mechanism comprises a touch-sensitive non-display area incapable of displaying electrically changeable data adjacent to and separate from a touch-sensitive display area, and wherein each of the plurality of gestures is performed by maintaining the continuous contact on a different combination across both the touch-sensitive non-display area and the touch-sensitive display area.

6. The method of claim 1, wherein the electronic device is docked within an automobile.

7. A non-transitory computer readable storage medium for controlling an electronic device, the electronic device operating on hierarchical data, the hierarchical data comprising at least two levels, the at least two levels each comprising at least one respective category, where each respective category in the at least two levels comprises at least one respective sub-category within a lower level in the hierarchical data, the computer readable storage medium comprising computer executable instructions for:

detecting a gesture of a plurality of gestures on a touch-sensitive input mechanism of the electronic device, each gesture in the plurality of gestures indicating a different respective number of hierarchical levels to move within hierarchical data, the gesture being independent of a presentation on the touch-sensitive input mechanism and maintaining continuous contact with the touch-sensitive input mechanism for the duration of the gesture; and selecting a second item within the hierarchical data based on detecting the gesture while a first item is selected, where the first item is within a current hierarchical level within the hierarchical data, the first item being within a first category defined within a second hierarchical level that is above the current hierarchical level within the hierarchical data, the second item being within a second category defined within the second hierarchical level where the second category is different from the first category, and the second hierarchical level and the current hierarchical level being separated in the hierarchical data by one or more intermediate levels equal to the respective number of hierarchical levels indicated by the gesture.

8. The non-transitory computer readable storage medium of claim 7, wherein each of the plurality of gestures comprises a different portion of a path.

9. An electronic device for operating on hierarchical data, the hierarchical data comprising at least two levels, the at least two levels each comprising at least one respective category, where each respective category in the at least two levels comprises at least one respective sub-category within a lower level in the hierarchical data, the electronic device comprising a processor, a touch-sensitive input mechanism and non-transitory memory, the non-transitory memory storing computer executable instructions for:

detecting a gesture of a plurality of gestures on a touch-sensitive input mechanism of the electronic device, each gesture in the plurality of gestures indicating a different respective number of hierarchical levels to move within hierarchical data, the gesture being independent of a presentation on the touch-sensitive input mechanism and maintaining continuous contact with the touch-sensitive input mechanism for the duration of the gesture; and selecting a second item within the hierarchical data based on detecting the gesture while a first item is selected, where the first item is within a current hierarchical level within the hierarchical data, the first item being within a first category defined within a second hierarchical level that is above the current hierarchical level within the hierarchical data, the second item being within a second category defined within the second hierarchical level where the second category is different from the first category, and the second hierarchical level and the current hierarchical level being separated in the hierarchical data by one or more intermediate levels equal to the respective number of hierarchical levels indicated by the gesture.

10. The electronic device of claim 9, wherein each of the plurality of gestures comprises a different portion of a path.

11. The electronic device of claim 9 further comprising a dock for mounting the electronic device within an automobile.

12. The electronic device of claim 9, wherein the touch-sensitive input mechanism comprises a touch-sensitive non-display area incapable of displaying electrically changeable data adjacent to and separate from a touch-sensitive display area, and wherein each of the plurality of gestures is performed by maintaining the continuous contact on a different combination across both the touch-sensitive non-display area and the touch-sensitive display area.

13. The method of claim 1, the plurality of gestures comprising multiple touch swipe gestures wherein each respective multiple touch swipe gesture has a respective number of simultaneous touches for the duration of the gesture, the respective number of simultaneous touches indicating the respective number of levels in the hierarchical data with which the respective multiple touch swipe gesture is associated.

14. The method of claim 1, the plurality of gestures comprising different length swipe gestures wherein each respective different length swipe gesture has a respective swipe length indicating the respective number of levels in the hierarchical data with which the respective different length swipe gesture is associated.

15. The method of claim 14, the different length swipe gestures comprising:

at least a first different length touch gesture including a swipe along both a non-display area and a display area of the touch-sensitive input mechanism; and at least a second different length gesture touch gesture including a swipe along only the display area of the touch-sensitive input mechanism, wherein the non-display area is incapable of displaying electrically changeable data.

16. The method of claim 1, the plurality of gestures comprising different length arcuate swipe gestures wherein each respective different length swipe gesture has a respective arcuate swipe length indicating the respective number of levels in the hierarchical data with which the respective different length arcuate swipe gesture is associated.

17. The method of claim 16, the different length arcuate swipe gestures comprising a plurality of complete circle swipe gestures wherein each respective complete circle swipe gesture has is defined by a respective number of complete circles indicating the respective number of levels in the hierarchical data with which the respective complete circle swipe gesture is associated.

18. The method of claim 1, wherein the hierarchical data is organized at each respective hierarchical level into at least one respective hierarchical level category of each respective hierarchical level, wherein each hierarchical level category of a particular hierarchical level is associated with respective hierarchical level categories other hierarchical levels, wherein each item within each respective hierarchical level is within one hierarchical level category of that respective hierarchical level, wherein the first item is in a first category of the current hierarchical level, and wherein the gesture further indicates selecting the second item from within a second category of the second hierarchical level where the second category of the second hierarchical level is not associated with the first category of the current hierarchical level.

19. The method of claim 18, wherein hierarchical level categories of each hierarchical level are arranged in a respective sequential series, wherein the first category of the current hierarchical level is associated with a first category of the second hierarchical level, and wherein the second category of the second hierarchical level is adjacent to the first category of the second hierarchical level according to the respective sequential series of the second hierarchical level.

20. The method of claim 1, wherein the selecting is independent of a presentation of the second object on the touch-sensitive input mechanism.

\* \* \* \* \*

UNITED STATES PATENT AND TRADEMARK OFFICE
CERTIFICATE OF CORRECTION

PATENT NO. : 9,817,568 B2
APPLICATION NO. : 13/408818
DATED : November 14, 2017
INVENTOR(S) : Robert Felice Mori et al.

It is certified that error appears in the above-identified patent and that said Letters Patent is hereby corrected as shown below:

On the Title Page

Column 1, delete "This patent is subject to a Terminal Disclaimer"

Signed and Sealed this
Twenty-first Day of August, 2018

Andrei Iancu
*Director of the United States Patent and Trademark Office*